United States Patent [19]

Nozawa

[11] 4,314,627
[45] Feb. 9, 1982

[54] SYNCHRONIZER RING FOR TRANSMISSION SYNCHROMESH DEVICE

[75] Inventor: Koji Nozawa, Higashikurume, Japan

[73] Assignee: Nissan Motor Co., Ltd., Yokohama, Japan

[21] Appl. No.: 60,359

[22] Filed: Jul. 25, 1979

[30] Foreign Application Priority Data

Aug. 1, 1978 [JP] Japan ................................. 53/93103

[51] Int. Cl.³ ...................... F16D 23/06; F16D 69/00
[52] U.S. Cl. .................................. 192/53 F; 74/339; 192/107 M
[58] Field of Search ................ 74/339, 411, 461, 443, 74/340; 192/53 F, 107 R, 107 M; 188/250 B, 251 M

[56] References Cited

U.S. PATENT DOCUMENTS

| 2,291,851 | 8/1942 | Wahlberg et al. | 74/443 X |
| 3,265,167 | 8/1966 | Yazell, Jr. | 188/250 B |
| 3,366,208 | 1/1968 | Kelbel | 192/53 F |
| 3,398,594 | 8/1968 | Keller | 74/443 X |
| 3,452,611 | 7/1969 | Simpson | 74/443 X |

FOREIGN PATENT DOCUMENTS

| 2744994 | 4/1979 | Fed. Rep. of Germany | 192/53 F |
| 46-15043 | 6/1967 | Japan | 192/53 F |
| 47-24053 | 7/1967 | Japan | 192/53 F |
| 945445 | 1/1964 | United Kingdom | 192/53 F |

Primary Examiner—Allan D. Herrmann
Attorney, Agent, or Firm—Thompson, Birch, Gauthier & Samuels

[57] ABSTRACT

A synchronizer ring for a synchromesh device for use in a transmission comprises an annular body of a wear-resistant metal forming a conical slide surface, and a main ring body made of a resin molded integrally on the annular body. The synchronizer ring according to the invention is light weight and economical of manufacture and can perform smooth contacts at chamfered surfaces and operate without producing any noise.

2 Claims, 2 Drawing Figures

SYNCHRONIZER RING FOR TRANSMISSION SYNCHROMESH DEVICE

BACKGROUND OF THE INVENTION

1. Field of the Invention

The present invention relates to a synchronizer ring or balk-ring for a synchromesh device for use in a transmission.

2. Description of the Prior Art

In hitherto used transmission synchromesh devices, balk-rings or synchronizer rings have conical slide surfaces adapted to be in slidable contact with conical slide surfaces of clutch gears made of steel. In order to avoid rapid wearing thereat, therefore, the synchronizer rings are usually made of wear-resistant metals as brass or bronze by casting, which are generally highly expensive. For the purpose of saving such expensive materials, an attempt has been made to make the synchronizer rings as thin as possible. However, when this is done, the rings undergo deformation because of a lack of rigidity, which in turn causes the synchronizing operation to malfunction. Moreover, noise is generated as a result of metal-to-metal contact at the clutch gears.

Moreover, when the synchronizing operation at the conical surfaces is affected by the contact of chamfered surfaces of splines of the coupling sleeve with chamfered surfaces of splines of the synchronizer ring, the contacts of the chamfered surfaces are not necessarily uniform at all the splines because the machined chamfered surfaces are not uniform in their configuration. Accordingly, the contacts at the conical slide surfaces are not uniform and thus unavoidably lower the synchronizing performance and durability of the synchromesh device.

SUMMARY OF THE INVENTION

It is an object of the invention to provide an improved synchronizer ring for use in a transmission syncro-mesh device, which avoids the disadvantages of the prior art above described.

It is further object of the invention to provide a synchronizer ring which is inexpensively manufactured and light weight and which can perform smooth contacts at chamfered surfaces and does not produce noise when engaging.

The invention will be more fully understood by referring to the following detailed specification and claims taken in connection with the appended drawings.

DETAILED DESCRIPTION OF THE PREFERRED EMBODIMENT

Figure 1:
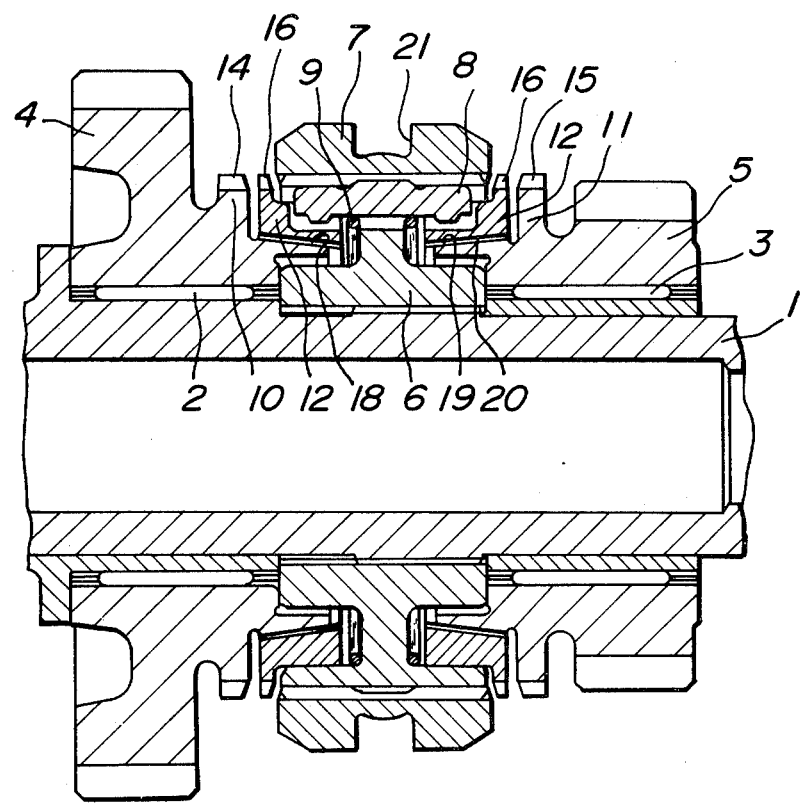
FIG. 1 is a longitudinal sectional view of a synchromesh device for forward and reverse gears used in a fork-lift truck.

Referring to FIG. 1 illustrating a synchromesh device for a forward and rearward gear assembly used, for example, in a fork-lift truck, a main shaft 1 rotatably supports thereon forward and reverse gears 4 and 5 with bearings 2 and 3 and is fitted thereon through spline grooves with a snchronizing hub 6 between the gears 4 and 5. A coupling sleeve 7 is arranged on the synchronizing hub 6 through spline grooves. Insert keys 8 are radially movably located between the synchronizing hub 6 and the coupling sleeve 7 and urged by spread springs 9 radially outwardly. The forward and reverse gears 4 and 5 are integrally provided with clutch gears 10 and 11, respectively. Between the synchronizing hub 6 and the clutch gears 10 and 11 are arranged balk-rings or synchronizer rings 12, respectively. These synchronizer rings 12 are formed in their outer peripheries with teeth 16 having the same pitch circle as that of teeth 14 of the clutch gears 10 and 11 and in their inner faces with conical slide surfaces 20 in opposition to conical slide surfaces 18 and 19 of the clutch gears 10 and 11.

In operation, with the synchromesh device for the transmission constructed as above described, the coupling sleeve 7 is shifted in an axial direction of the main shaft 1 by means of a shift fork (not shown) engaged in an engaging groove 21 formed in the outer periphery of the coupling sleeve 7 to bring selectively the conical slide surface 20 of the synchronizer ring 12 or 13 into contact with the conical slide surface 18 or 19 of the clutch gear 10 or 11 of the forward or reverse gear 4 or 5, thereby exerting a frictional torque therebetween to synchronize the gear 10 or 11 with the coupling sleeve 7. In this manner, a power is transmitted through the forward or reverse gear 4 or 5 to the main shaft 1 for forwardly or reversely driving a vehicle.

Figure 2:
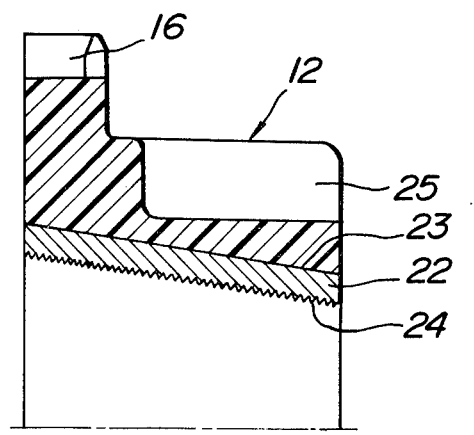
FIG. 2 is a partial sectional view of a synchronizer ring according to the invention.

According to the invention, as shown in FIG. 2, the conical slide surface portion of the synchronizer ring 12 is formed by an annular thin metal body 22 in the form of a hollow frusto-cone made of a wear-resistant material such as brass or bronze. The annular body 22 has an outer surface 23 which is uneven or rough to a suitable extent and an inner slide surface 20 formed with screw thread-like serrations 24.

A thick main ring body 25 is molded integrally on the annular metal body 22 constituting the conical slide surface. The main ring body 25 is made of resin, for example, phenol resin including asbestos. The resin for the main ring body 25 may be other resins for gears such as tetrafluoroethylene, trifluorochloroethylene, polyester resin reinforced with glass woven fabric and the like.

The synchronizer ring according to the invention requires only a small amount of an expensive material without sacrificing the wear-resistance required for the ring. Moreover, the ring can be mass-produced with ease because of the resin molding process, which can obtain inexpensive and light weight ring. The resilience of the resin serves to correct wrong contacts at chamfered surfaces to uniform contacts. This naturally improves the contacts at the conical surfaces with resulting improved synchronizing performance and wear-resistance. Furthermore, sounds resulting from the engagements, sliding movements and contacts are absorbed in the resin material so as to reduce the noise from the synchromesh device.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A synchronizer ring for a transmission synchromesh device comprising: an annular inner body of a wear-resistant metal having an interior conical slide surface, and an annular outer body of a resilient resin integrally molded onto the outer surface of said inner body, the radial thickness of said inner body being small in comparison to that of said outer body.

2. The synchronizer ring of claim 1 wherein said interior conical slide surface is provided with screw thread-like serrations.

* * * * *